United States Patent [19]

Stiles et al.

[11] Patent Number: 5,163,140
[45] Date of Patent: Nov. 10, 1992

[54] TWO-LEVEL BRANCH PREDICTION CACHE

[75] Inventors: David R. Stiles, Sunnyvale; John G. Favor, San Jose; Korbin S. Van Dyke, Fremont, all of Calif.

[73] Assignee: Nexgen Microsystems, San Jose, Calif.

[21] Appl. No.: 844,995

[22] Filed: Mar. 2, 1992

Related U.S. Application Data

[63] Continuation of Ser. No. 485,306, Feb. 26, 1990, abandoned.

[51] Int. Cl.[5] ................. G06F 12/00; G06F 12/08
[52] U.S. Cl. ................. 395/425; 395/375; 364/DIG. 1; 364/243.41; 364/261.3
[58] Field of Search ................. 395/425, 375; 364/DIG. 1

[56] References Cited

U.S. PATENT DOCUMENTS

| | | | |
|---|---|---|---|
| 4,295,193 | 10/1981 | Pomerene. | |
| 4,442,488 | 4/1984 | Hall | 364/200 |
| 4,594,659 | 6/1986 | Guenthner et al. | 364/200 |
| 4,679,141 | 7/1987 | Pomerene et al. | 364/200 |
| 4,722,050 | 1/1988 | Lee et al. | |
| 4,775,955 | 10/1988 | Liu. | |
| 4,777,587 | 10/1988 | Case et al. | |
| 4,777,594 | 10/1988 | Jones et al. | |
| 4,796,175 | 1/1989 | Matsuo et al. | 364/200 |
| 4,802,113 | 1/1989 | Onishi et al. | |
| 4,827,402 | 5/1989 | Wada. | |
| 4,847,753 | 7/1989 | Matsuo et al. | 364/200 |
| 4,853,840 | 8/1989 | Shibuya. | |
| 4,860,199 | 8/1989 | Langendorf et al. | 364/200 |
| 4,882,673 | 11/1989 | Witt | 364/200 |
| 4,894,772 | 1/1990 | Langendorf | 364/200 |
| 4,926,323 | 5/1990 | Baror et al. | |
| 4,933,837 | 6/1990 | Freidin. | |
| 4,942,520 | 7/1990 | Langendorf. | |
| 4,943,908 | 7/1990 | Emma et al. | 364/200 |
| 4,991,078 | 2/1991 | Wilhelm et al. | |

OTHER PUBLICATIONS

David R. Stiles and Harold L. McFarland; "Pipeline Control for a Single Cycle VLSI Implementation of a Complex Instruction Set Computer"; *Computer Society of the IEEE*; pp. 504-508.

A. Thampy Thomas; "A Single Cycle VLSI CISC-Based Workstation: System Overview and Performance Characteristics"; *Computer Society of the IEEE*; pp. 500-503.

Atiq Raza; "Technology Constraints on VLSI Processor Implementation"; *Computer Society of the Thirty-Fourth IEEE*; pp. 509-512.

*Primary Examiner*—Eddie P. Chan
*Attorney, Agent, or Firm*—Townsend and Townsend

[57] ABSTRACT

An improved branch prediction cache (BPC) scheme that utilizes a hybrid cache structure. The BPC provides two levels of branch information caching. The fully associative first level BPC is a shallow but wide structure (36 32-byte entries), which caches full prediction information for a limited number of branch instructions. The second direct mapped level BPC is a deep but narrow structure (256 2-byte entries), which caches only partial prediction information, but does so for a much larger number of branch instructions. As each branch instruction is fetched and decoded, its address is used to perform parallel look-ups in the two branch prediction caches.

3 Claims, 9 Drawing Sheets

TWO-LEVEL BRANCH PREDICTION CACHE

This is a continuation of application Ser. No. 07/485,306, filed Feb. 26, 1990, now abandoned.

CROSS REFERENCE TO RELATED APPLICATIONS

The following applications are related in subject matter and were filed concurrently with this application on Feb. 26, 1990:

Ser. No. 07/485,307, entitled Integrated Single Structure Branch Prediction Cache now U.S. Pat. No. 5,093,778;

Ser. No. 07/485,312, entitled Method and Apparatus for Store-Into-Instruction-Stream Detection and Maintaining Branch Prediction Cache Consistency; and Ser. No. 07/485,304, entitled Integrated Instruction Queue and Branch Target Cache.

BACKGROUND OF THE INVENTION

The present invention relates generally to cache structures in computer systems, and more specifically to cache structures that aid in predicting conditional and unconditional branches.

As computer designers have designed increasingly higher performance implementations of various computer architectures, a number of classes of techniques have been developed to achieve these increases in performance. Broadly speaking, many of these techniques can be categorized as forms of pipelining, caching, and hardware parallelism. Some of these techniques are generally applicable to and effective in the implementation of most types of computer architectures, while others are most appropriate in the context of speeding up the implementations of complex instruction set computers (CISC's).

Due to the nature of typical CISC instruction sets, the processing of each instruction often requires a relatively long sequence of operations to be performed. Lower performance implementations consequently spend a large number of processor cycles performing these operations in a largely sequential, though possibly somewhat overlapped, manner. High performance implementations, on the other hand, often resort to using large degrees of hardware parallelism and pipelining to improve the processing throughput rate of the central processing unit (CPU).

In both cases, the processing latency for each instruction is large; in the latter case, though, the goal is to achieve the appearances of each instruction requiring only one or a few processor/clock cycles to be processed. As long as the processing of successive instructions can be successfully pipelined and more generally overlapped, this goal is achieved. Typically, however, various types of dependencies between neighboring instructions result in processing delays.

A number of techniques are available to reduce or eliminate the impact of these dependencies. One area where this is critical is in the handling of control dependencies, i.e. branching type instructions. In the context of a CISC architecture implementation, the handling of such dependencies is difficult. CISC architecture requires the ability to quickly calculate or otherwise determine the target address of the branch, to quickly resolve the proper path of subsequent instruction processing in the case of conditional branches, and in all cases to then quickly restart the fetching of instructions at the new address. To the extent that these operations cannot be performed quickly, pipeline processing delays result.

Relatively long pipelines, or at least large processing latencies, typical in a high performance CISC implementation, make these operations difficult to consistently speed up. These latencies, in conjunction with inter- and intra-instruction dependencies, result in inherent delays in the performance of these operations.

Various prediction and caching techniques can be applied to minimize the actual impact of these delays on processing throughput. These techniques attempt to consistently and accurately predict the information to be produced by the above operations. Such information may include branch target address, conditional branch direction, and the first one or more instructions at the branch target address. The percentage success rates of these prediction techniques then reduce the effective delay penalties incurred by the above three operations by corresponding amounts. In the extreme and ideal case of 100% success rates, these delays potentially can be eliminated.

Many of these prediction and caching techniques are based on the retention or caching of information from the prior processing of branch instructions. When a branch instruction is encountered again, and information from previous processing(s) of this instruction is still to be found in the prediction cache structure, this cached information is then used to make an intelligent dynamic prediction for the current occurrence of the branch. When no such information is to be found in the prediction cache structure, either a less intelligent static prediction must be made, or normal processing, with the attendant possibility of incurring delays, must be performed.

Past high performance CISC designs have used forms of cache structures to hold various combinations of information to be used in predicting one or more of the three types of information mentioned above. An aggressive all-encompassing design could be envisioned in which a fully associative cache of a few thousand entries was utilized. Each entry would hold a record of the actual target address associated with the last occurrence of the branch; a copy of the first several instructions at this target address; and in the case of conditional branches a history record of the direction taken by each of the past several branch occurrences.

In parallel with the fetching and/or decoding of a branch instruction, the instruction would also be looked up in the branch prediction cache. Generally, this look-up would be based on the fetch address of the branch or a closely related address. As the instruction is being decoded the branch history information would be used to predict the direction of conditional branches; this would determine whether subsequent instruction processing should continue with the instructions sequentially following the branch, or with the sequence of instructions starting at the target address.

Whether the branch is conditional or unconditional, if processing is to continue with the target instruction stream, then the processing of successive instructions would proceed without delay using the branch target instructions from the cache. At the same time fetching of further non-cached instructions immediately would be initiated using the predicted branch target address, plus an appropriate increment.

While this branch prediction design offers the possibility of high prediction rates and fast processing of predicted branches, a large amount of relatively fast hardware would be required for implementation. For most CPU implementations, a design of this scale and scope would be impractical and/or involve a poor cost/performance trade-off. While the performance potential of a branch prediction scheme of this sort is very desirable, the associated hardware cost is simply too high.

In most instances, the resultant cost and performance do not justify this type of branch prediction scheme, and require a more cost-effective approach.

Typically, a branch prediction cache design incorporated into a high performance CPU implementation would be of a smaller scope. It would not attempt dynamic prediction of all three of the following: target address, target instructions, and conditional branch direction. It would also be of a smaller scale. Prediction success rates and degree of branch processing acceleration are necessarily traded-off to reduce the cost to an acceptable level.

SUMMARY OF THE INVENTION

The present invention is an improved branch prediction cache (BPC) scheme that utilizes a hybrid cache structure to achieve a more cost-effective trade-off between hardware cost and performance improvement. The invention combines most of the branch processing acceleration of a full scope prediction cache design with the lower cost of simpler and/or smaller prediction cache structures.

In brief, the invention provides two levels of branch information caching. The first level BPC is a shallow (36 entries) but wide (entries are approximately 32 bytes each) structure which caches full prediction information for a limited number of branch instructions. The second level BPC is a deep (256 entries) but narrow (entries are approximately 2 bytes each) structure which caches only partial prediction information, but does so for a much larger number of branch instructions. As each branch instruction is fetched and decoded, its address is used to perform parallel look-ups in the two branch prediction caches.

Through proper organization of these two cache structures individually, and proper combining and coordination of their joint operation, an overall performance benefit is achieved approximating that of a single cache structure with the prediction information width of the first level BPC and a number of cache entries equal to the second level BPC. The amount of hardware circuitry required to implement the two-level hybrid cache structure is much less than for single deep and wide cache structure.

The first level BPC comprises entries containing a relatively large amount of prediction information. In the preferred embodiment, each first level cache entry contains the target address from when the branch instruction was last executed; up to the first 24 bytes of sequential instruction stream starting at the target address; and two history bits recording the direction taken during the most recent two executions of the branch instruction.

The first level BPC preferably uses an associative access method. A cache tag for each entry, namely the instruction address of the branch associated with the entry, is stored in a content addressable memory (CAM) array. A first level cache look-up is performed by accessing this array using the above next instruction address, and then reading out the prediction information from any, at most one, entry for which there was a tag match. Full associativity maximizes the prediction cache's hit rate for a given cache size (number of entries).

The second level BPC, unlike the first level BPC, comprises entries containing only a limited amount of prediction information. This is offset by the much larger number of entries, compared to the first level cache, which are capable of implementation with a given amount of hardware circuitry.

The size of a second level cache entry is dramatically reduced by not caching target instructions, while the extent to which branch processing can be accelerated is reduced only moderately. This especially makes sense given that the second level cache serves as a backup to the first level cache. With this much larger size, even given the direct-mapped organization, the second level cache provides an effective backup to the first level cache.

In the preferred embodiment of this invention, a second level cache entry holds only a partial target address and one history bit. The predicted direction of a conditional branch is based simply on the direction last taken by that branch. The branch target address is assumed to be within a subset of the instruction address space also containing the branch instruction. The full predicted target address is a concatenation of the upper address bits from the branch instruction's address with the lower 16 bits from the cache entry.

The second level BPC uses a direct-mapped access method, versus a set or fully associative method. This is acceptable due to the relatively large number of second level cache entries. Even more significantly, it is then possible to discard the tag and tag storage associated with each cache entry. In essence, when a cache look-up accesses a selected entry, it is simply assumed that the tag and look-up address match.

A further understanding of the nature and advantages of the present invention may be realized by reference to the remaining portions of the specification and the drawings.

DESCRIPTION OF THE PREFERRED EMBODIMENT

System Overview

Figure 1:
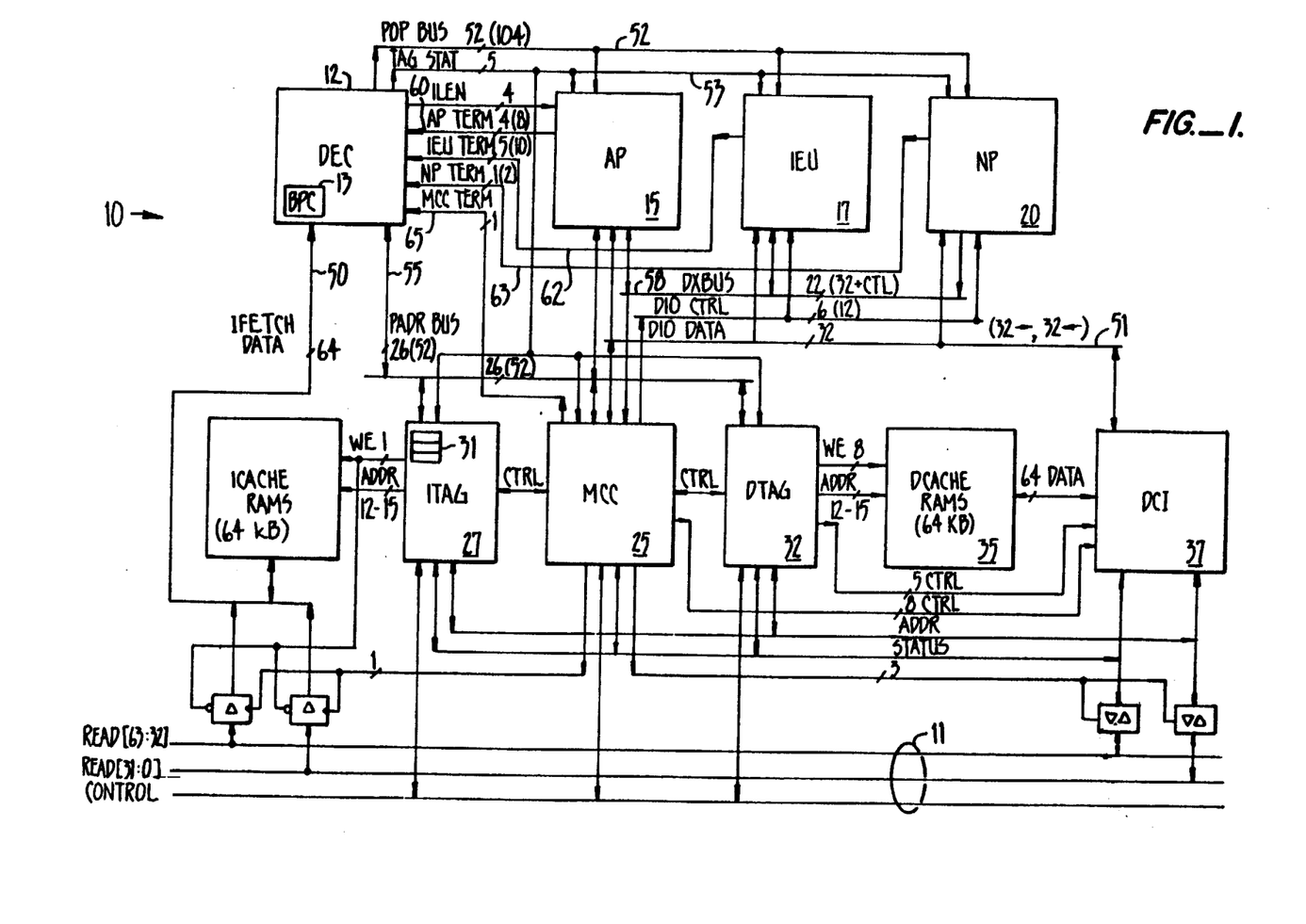
FIG. 1 is a block diagram of a computer system incorporating the present invention.

FIG. 1 is a block diagram of a CPU 10 incorporating the present invention. The CPU, sometimes referred to as the F86, is designed to execute an instruction set (macro-instructions) compatible with that of the Intel 80386, as described in the Intel 80386 Programmer's Reference Manual published by Intel Corporation, Santa Clara, Calif., 1986. Each block in the diagram corresponds generally to a separate integrated circuit chip or group of chips in a current embodiment. The CPU communicates with external devices such as memory controllers, I/O devices, and possibly other CPU's via a system bus 11. References below to functional units will normally be understood to means elements within CPU 10, not such external devices.

An Instruction Decoder (DEC) 12 performs instruction fetch, instruction decode, and pipeline control. DEC 12 optionally interleaves instruction prefetch of up to three simultaneous instruction streams. DEC 12 contains a two-level Branch Prediction Cache (BPC) 13. The BPC includes an integrated structure which contains dynamic branch history data, a physical branch target address, and a branch target buffer for each cache entry. As branch instructions are decoded, the BPC is consulted for information about that branch. Independent of the direction predicted, branches are executed in a single cycle and do not cause pipeline bubbles.

On each cycle, a macro-instruction is selected from one of the three instruction buffers or a branch target buffer in the BPC. The macro-instruction is decoded, assembled into an internal 96-bit decoded instruction word, referred to as a pseudo-op (p-op) or sometimes as an instruction or operation, and dispatched to the various functional units. Instruction decode generally proceeds at a single cycle rate. Each p-op issued by DEC 12 is given a tag which uniquely identifies each p-op currently outstanding in the machine. Tags are issued in increasing order, allowing easy determination of relative age of any two outstanding tags. Bus transactions between chips include the tag of the originating p-op. Functional units pair up p-op, addresses, and operands with these tags.

DEC 12 is also responsible for tracking the status of outstanding p-op, pipeline control, and for invoking exception processing when needed.

An address Preparation Unit (AP) 15 calculates effective addresses, performs segment relocation, and implements a demand paged memory management system. It contains a translation lookaside buffer (TLB).

An Integer Execution Unit (IEU) 17 performs single cycle execution of most integer instructions. It contains an 8×32 multiplier and accumulator array, as well as microcode for multiply and divide instructions. The pipeline control architecture allows the IEU to perform parallel and/or out-of-order execution of integer instructions.

A Numerics Processor (NP) 20 may optionally be included in the CPU. It is a high performance implementation of the IEEE floating point standard. The NP is integrated into the pipeline and does not incur any special overhead for the transfer of instructions and operands. Integer (IEU) and floating point (NP) instructions execute concurrently.

A memory and Cache Controller (MCC) 25 is responsible for controlling the instruction and data caches and implements the cache coherency protocol. The MCC controls the interface to the system bus 11, supporting high speed single and block mode transfers between cache and memory. As described below, the MCC also contains write reservation tables for integer, floating point, and system writes, and includes read after write short circuit paths.

An instruction cache subsystem includes a tag RAM chip (ITag) 27 and cache RAM chips (ICache) 30. Each entry in ITag 27 contains the address tag, a Valid bit, and an Attention bit for a corresponding line in ICache 30. The Attention bit indicates that the DEC chip may also have data from this line cached in the BPC. ITag 27 also includes a set of instruction stream address registers 31, each of which contains a fetch address associated with a respective one of three possibly outstanding streams.

A data cache subsystem includes a tag RAM chip (DTag) 32 and cache RAM chips (ICache) 35. DTag 32 contains the address tag and line state bits for each line in DCache 35. The possible line states are Absent, Shared Read, Owned Clean, and Owned Dirty, supporting a writeback multiprocessor cache coherency protocol (modified write once). The tag RAM is dual ported to allow both CPU and bus snooping cache lookups in a single cycle. A Data Cache Interface (DCI) chip 37 interfaces DCache 35 to system bus 11.

Each functional unit chip is packaged in a custom ceramic PGA which contains power and ground planes and associated decoupling capacitors. Roughly 25% of the pins are dedicated to power and ground. For 0.8 micron to 1.2 micron processes, I/O delays are comparable to on-chip critical paths. Inter-chip I/O is incorporated into the pipeline, and thus does not add to the machine cycle time. ICache 30 and DCache 35 use conventional static RAMs.

Communications between the various functional units are carried out over a number of internal buses. These include: a 64-bit IFETCH_DATA bus 50 for instruction fetches; a 104-bit p-op bus 52 for communicating issued p-ops to the AP, the IEU, the MCC, and the NP; a 5-bit tag status bus 53 for communicating outstanding p-op information to the AP, the IEU, the MCC, and the NP; a 52-bit physical address bus (PAdrBus) 55 for communicating physical addresses; a 64-bit (32 bits in each direction) data cache bus (DIOBus) 57 for data cache transfers; a 32-bit data exchange bus (DXBus) 58 for inter-chip exchange; a 64-bit bus for cache/memory updates; and a number of termination buses, namely an AP termination bus 60, and IEU termination bus 62, an NP termination bus 63, and an MCC termination bus 65 from the functional units to DEC 12. Some of these buses are full width and some half-width (time multiplexed). Interactions between functional units are generally limited to well defined transactions on the internal processor buses.

Pipeline Control System Overview

Pipeline control of the processor is distributed across the functional units mentioned above. No centralized scheduling or score boarding of the pipeline is performed. DEC 12 does observe certain overall resource constraints in the architecture and will occasionally hold off on issuing a p-op which would violate resource limitations. Each functional unit is responsible for scheduling its own internal operations. Interlock checking is performed at a local level.

In a deeply pipelined machine, exception detection at various stages in the pipeline creates significant control difficulties. Each stage must be careful to hold off modification of state while any other stage may yet detect an exception on a previous instruction. Special purpose control logic is common, and careful pipeline simulations must be performed.

The processor deals with this complexity using a few techniques which are simple, general, and powerful. DEC 12 issues decoded instructions (p-ops) and the functional units process addresses and operands without regard for the consequences of exceptions detected by other functional units. As noted above, each p-op is assigned a tag by DEC 12 when it is issued, and the DEC uses this tag to track the p-op.

DEC 12 is responsible for determining when execution has proceeded beyond the point of an exception.

Using techniques described below, the DEC will restore the state of the machine to the point immediately preceding (fault exceptions) or following (trap exceptions) the p-op causing the exception.

As noted above, each functional unit has a termination bus back to DEC 12. Signals on these buses indicate (by tag) when p-ops have been completed and what exceptions (if any) were detected by that unit. The DEC uses this information to keep track of what p-ops are outstanding in the machine, to track resource constraints, and to decide when exception processing must be initiated.

In response to abnormal terminations, DEC 12 will back up the state of the machine to the point of the exception, and begin issuing either a different instruction stream or a sequence of micro-instructions to invoke an exception handler. The processor uses one or more of five general mechanisms to permit the machine to be backed up to a particular state as part of DEC's response to abnormal terminations. These are issuing abort cycles, reassigning registers, using write reservation tables, using history stacks, and functional unit serialization.

Abort cycles are issued by DEC 12 when instructions which have been issued by the DEC must be flushed from the machine. During an abort cycle all functional units are provided a tag which identifies the boundary between instructions which should be allowed to complete and instructions which must be purged from the machine.

Register reassignment is used to restore the state of the general register files and the segment register file, flushing any modifications made for instructions which must be aborted. The functional units have more registers physically available than the instruction set specifies. DEC 12 maintains a set of pointers which map the programmer visible (or virtual) registers onto the physical registers. In assembling decoded instructions, the DEC will substitute the appropriate physical register numbers into the register specification fields.

When a virtual register is to be modified, the DEC will first allocate a new physical register, modify the pointer set, and use the allocated register number as a destination register. Following execution of the instruction, the old physical register still contains the original value of the virtual register, while the new physical register contains the modified value of the virtual register. To back out of the register modification, the DEC must restore the pointer set to its value prior to issue of the instruction.

As physical registers are freed up, they are placed at the end of a free list which is sufficiently long to guarantee that a physical register will not appear at the head of the free list until after its contents are no longer required. The DEC maintains a history stack of pointer values, as is described below.

Write reservation tables are used in MCC 25 to queue up data writes until it is known that the writes will not have to be aborted. The MCC receives addresses and operands on the internal data buses, matches them up by tag, and performs the irreversible write when it is safe to do so.

History stacks are used for saving and restoring miscellaneous machine state, such as the register reassignment pointers, flags register, and program counter.

For machine state which is rarely modified, the cost of a history stack of values is not justified. For these cases, the functional unit which is to perform the modification (and only that unit) halts processing, and the tag of the oldest outstanding instruction in the machine (as provided by the DEC) is examined on each cycle to determine when all older instructions in the machine have been successfully completed. At this point there is no longer any need to preserve the old value of the machine state and the functional unit makes an irreversible change to the machine state.

The distributed pipeline control scheme, combined with the ability to back out of any state modification, allows a number of performance optimizations.

Each functional unit may receive all p-ops, but deals only with p-ops which actually require processing in that unit. This is in contrast to conventional pipelines in which instructions flow through all stages in the pipeline, whether the stage has useful work to do or not.

Furthermore, each unit performs an operation as soon as all input operands are available. P-ops that are not ready for immediate execution are stored in that unit's p-op queue. When complete, the result is passed to the next stage for further processing, and the next operation is examined. A stage only stops execution when it has nothing available for execution.

This behavior allows out-of-order execution between functional units. For a memory write which has an address generate interlock, for example, the AP will not be able to compute the memory address. The IEU, however, is able to provide the data and does so immediately, after which it continues on to the next instruction. The AP's interlock does not need to create a pipeline bubble in any other pipeline stage. Later on, the IEU may be held up performing a multiply, or waiting for a memory operand. At this time, the AP has a chance catch-up with the IEU.

From the viewpoint of a particular functional unit, this isn't a complicated concept. The functional unit makes a local decision, completely unaware that it might cause instructions to be completed out-of-order. The pipeline control mechanisms gurantee that any modifications made by an instruction executed out-of-order can be purged. The functional unit makes no special checks.

Out-of-order execution between functional units happens for free as a result of the distributed decision making within the processor. Even within a functional unit, instructions could be safely executed out of order. IEU 17 provides an example of internal out of order execution. The IEU examines the instruction at the head of it's instruction queue to see if it is ready to execute. If a data interlock prevents immediate execution, the IEU will examine the next younger instruction to see if it is ready to execute. This process can continue until an instruction is found which can execute. The IEU will only pay a data interlock penalty if there is no instruction available which is ready to execute.

Note that even if the IEU pays an interlock penalty, that doesn't mean that the processor as a whole loses a cycle. The IEU may have been running ahead of other functional units at the time. Even if the IEU falls behind, it may be able to catch up later when an instruction is issued which does not require the IEU. Finally, the penalty cycle(s) may be overlapped with penalty cycle(s) from AP 15.

A special case of a functional unit choosing to execute instructions out-of-order is parallel execution of instructions within the functional unit. In particular, this concept is applied to instructions which take multiple cycles. Parallel execution of other single cycle instructions allows the multi-cycle instruction to have an effective throughput of one cycle.

DCache misses would normally stop the pipeline for a full cache miss penalty. To the extent that the functional units can continue to find operations that can be executed without the cache data, the cache miss penalty is reduced. The same is true for misses in the AP chip's TLB. These cases are different from the others in that the number of penalty cycles is usually fairly high, making it difficult to fully overlap them with useful work.

BPC Overview

It is useful as a threshold matter to review what a branch instruction is. The instruction causing a change in control flow is called a branch instruction, and the address of this instruction is called the branch instruction address. The branch instruction may include within it the address of the instruction to be branched to, which is called the branch target instruction. The address of the branch target instruction is the target address. Alternately, a formula for calculating the target address may be included in the branch instruction. In addition, the branch instruction may be a conditional branch. A conditional branch causes a jump to a branch target instruction only if a test set forth in the branch instruction is met. If the condition is not met, then the branch is not taken and sequential execution continues.

Figure 2:
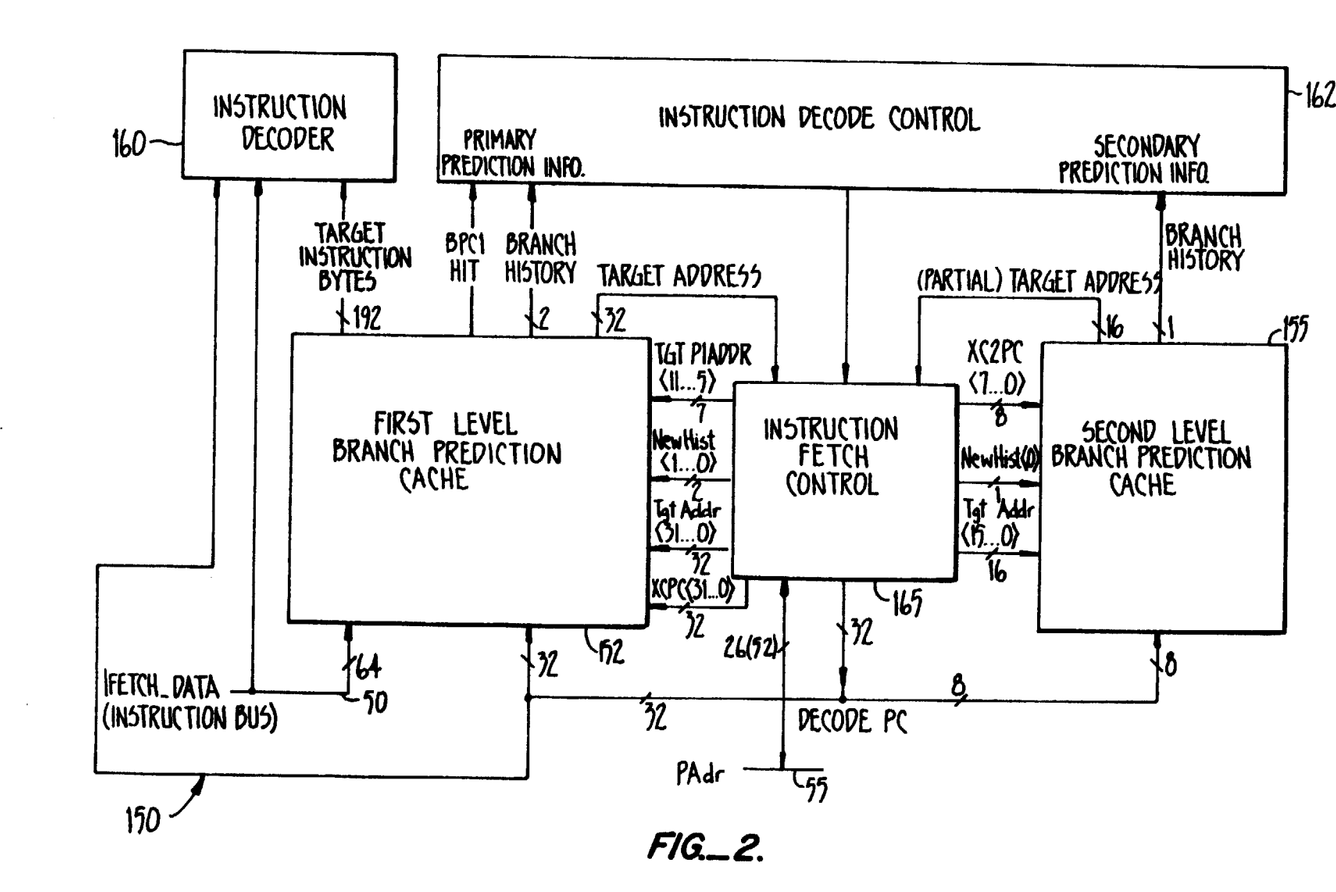
FIG. 2 is an overall block diagram of the branch prediction cache (BPC) and its immediate environment.

FIG. 2 is a block diagram of BPC 13 according to the present invention. In accordance with the present invention, the BPC is a two-level structure including a first level BPC 152 and a second level BPC 155. As noted above, BPC 13 is located within the multi-function DEC chip and communicates with an instruction decoder (ID) 160, instruction decode control circuitry (IDC) 162, and instruction fetch control circuitry (IFC) 165. The primary function of IDC 162 is to control decoding of instructions, and in particular to ensure the proper handling of branches based on information from the BPC. IDC 162 also determines where instructions can be fetched from and controls IFC 165 accordingly. IFC 165 fetches from ICache 30 or main memory, generates fetch PC's, and provides a delayed version of the fetch PC as a decode PC to the first and second level BPC's.

As will be discussed in greater detail below, first level BPC 152 is a shallow but wide structure which caches full prediction information for a limited number of branch instructions. In particular, first level BPC 152 contains 36 entries, each including 4 bytes for branch address tag with a valid bit, 4 bytes for target address, two history bits, and 24 target instruction bytes with 3 target instruction valid (TIV) bits. Second level BPC 155 is a deep but narrow structure which caches only partial prediction information but for a much larger number of branch instructions. Second level BPC 155 contains 256 entries, each containing two bytes of partial target address information and one history bit.

In parallel with instruction decoding, the instruction's decode PC is used to perform parallel lookups in the first and second level BPC's. (Since the incoming instructions have not been decoded at this point, non-branch instructions are also checked). In the event of a hit on first level BPC 152, the target instruction bytes are communicated to instruction decoder 160, the branch history bits are communicated to IDC 162, and the target address is communicated to IFC 165. As will be discussed below, second level BPC 155 is always assumed to hit. Therefore, second level BPC 155 communicates the branch history bit to IDC 162 and the partial target address to IFC 165 on every access.

Based on this target address information, IFC 165 sends a target address to AP and a fetch address to ITAG 27 on PAdrBus 55. In the event of a hit on the first level BPC, the fetch address is offset from the target address by the number of target instruction bytes cached for that branch. In the event of a miss, the fetch address and the target address are the same.

Note that prediction information for a branch, i.e., a valid cache entry associated with the instruction, is created only after a branch is encountered at least once and continues to exist in the cache only until replaced by a set of prediction information for another branch. As with most caching strategies, the benefit of these cache schemes primarily exists on a statistical basis. When the cache does not contain an entry for a branch instruction about to be processed, the pipeline becomes exposed to branch processing delays. To result in a net performance benefit the cache must provide enough prediction information to enable suitable acceleration of branch processing, and it must provide it for a high enough percentage of the branch instructions processed by the CPU.

These two levels of cache cooperate to provide an overall performance benefit approximating that of a single cache structure with the prediction information width of the first level cache and a number of cache entries equal to the second level cache. The amount of hardware circuitry required to implement the two-level hybrid cache structure is much less than for the single "deep and wide" cache structure.

First Level BPC

Figure 3:
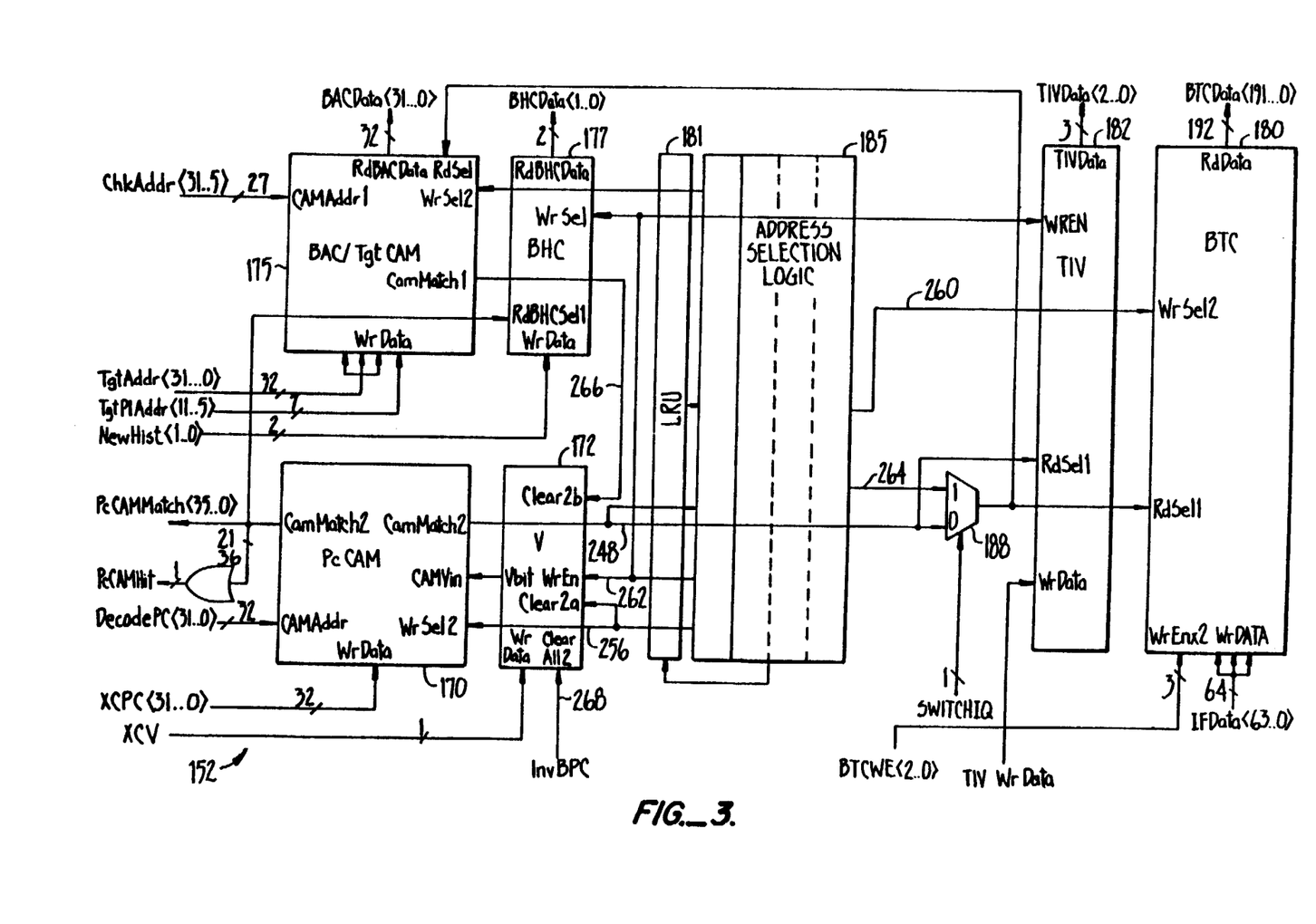
FIG. 3 is a block diagram of the first level BPC.

FIG. 3 is a block diagram showing the various elements in first level BPC 152. The first level BPC comprises entries containing a relatively large amount of prediction information. In the preferred embodiment, this cache structure contains a full scope of information to enable single branch execution, including: the branch direction if the branch is conditional, the branch target address, and cached target instruction data. More specifically, each first level cache line contains the target address from when the branch instruction was last executed; up to the first 24 bytes of sequential instruction stream starting at the target address; and two history bits recording the direction taken during the past executions of the branch instruction.

To this end, first level BPC 152 includes a program counter cache (PCC) preferably implemented as a program counter content addressable memory (PcCAM) 170 with associated valid bit (Vbit) memory 172. The target address memory is a branch address cache/target CAM (BAC/TgtCAM) 175. The history of past branch directions is stored in a branch history cache (BHC) 177. A branch target cache (BTC) 180 contains the target instruction data, with an associated target instruction valid (TIV) memory 182. Each of the memory arrays contains 36 lines and is directly accessed via word select inputs (as opposed to encoded word address inputs). Some of these sets of word selects for reading and writing each line are generated by address selection logic 185 with an associated multiplexer network 188. Other word selects are generated by the match outputs of PcCAM 170. A least Recently Used (LRU) logic block 181 has logic which performs the function of selecting a BPC line to be overwritten by a new block of instruction data.

Given the relatively limited size of this first level cache, it is designed to support accesses in a highly associative manner versus a direct-mapped or two/four-way set associative manner. This look-up, to check whether an entry currently exists in the cache for a branch about to be processed, is typically performed using the address of the branch instruction. For some pipeline designs, a closely related address may instead need to be used.

In this context, the term fully associative means that bits of the input address are compared with potentially matching bits of all the entries in cache. A hit is defined to have occurred when the input address matches at least one stored address. The term direct mapped means that some number of bits of the input address are used to index into the memory, and the remaining bits are stored in the memory. When the entry is read out of the memory, the stored address bits are compared with the corresponding bits in the input address, and a hit is defined to have occurred when the two agree. This entails a single comparison. In the event that two branch instructions index to the same entry (different PC's with the same set of index bits), a direct mapped cache can only accommodate one, even if there are other empty entries. The term two-way set associative refers to a structure with two memory banks, so that two entries are read out for a given index and two comparisons are performed. This concept can be expanded to more than two-way set associative.

In the preferred embodiment the address of the first byte of the next instruction to be decoded is used for the look-up in the first level BPC, and is done in parallel with instruction fetch completion and start of instruction decode. This look-up is also done in a fully associative manner which provides substantial performance improvement relative to direct-mapped or two/four-way set-associative access methods.

A cache tag for each entry, namely the instruction address of the branch associated with the entry, is stored in PcCAM 170. A first level cache look-up is performed by accessing PcCAM 170 using the above next instruction address, and then reading out the prediction information from any, but at most one, entry for which there was a tag match.

This greater associativity is with respect to both cache look-ups and cache replacements, i.e. when adding each entry to the cache a new entry to the cache requires that some other (hopefully less beneficial) entry be removed to make room. Through the greater flexibility in choosing "old" entries to be replaced by new entries, it is statistically possible to better approximate the ideal of retaining prediction information for the branches deemed most likely to be processed again in the near future and the most often. In essence, full associativity maximizes the prediction cache's hit rate for a given cache size (in number of entries).

The circuitry will now be described with additional reference to a series of logic schematics. Each logic schematic for one of the memories shows the circuitry for one line in that memory. Since there are 36 lines in first level BPC 152, the circuitry shown for a given memory is repeated 36 times for that memory.

Figure 4:
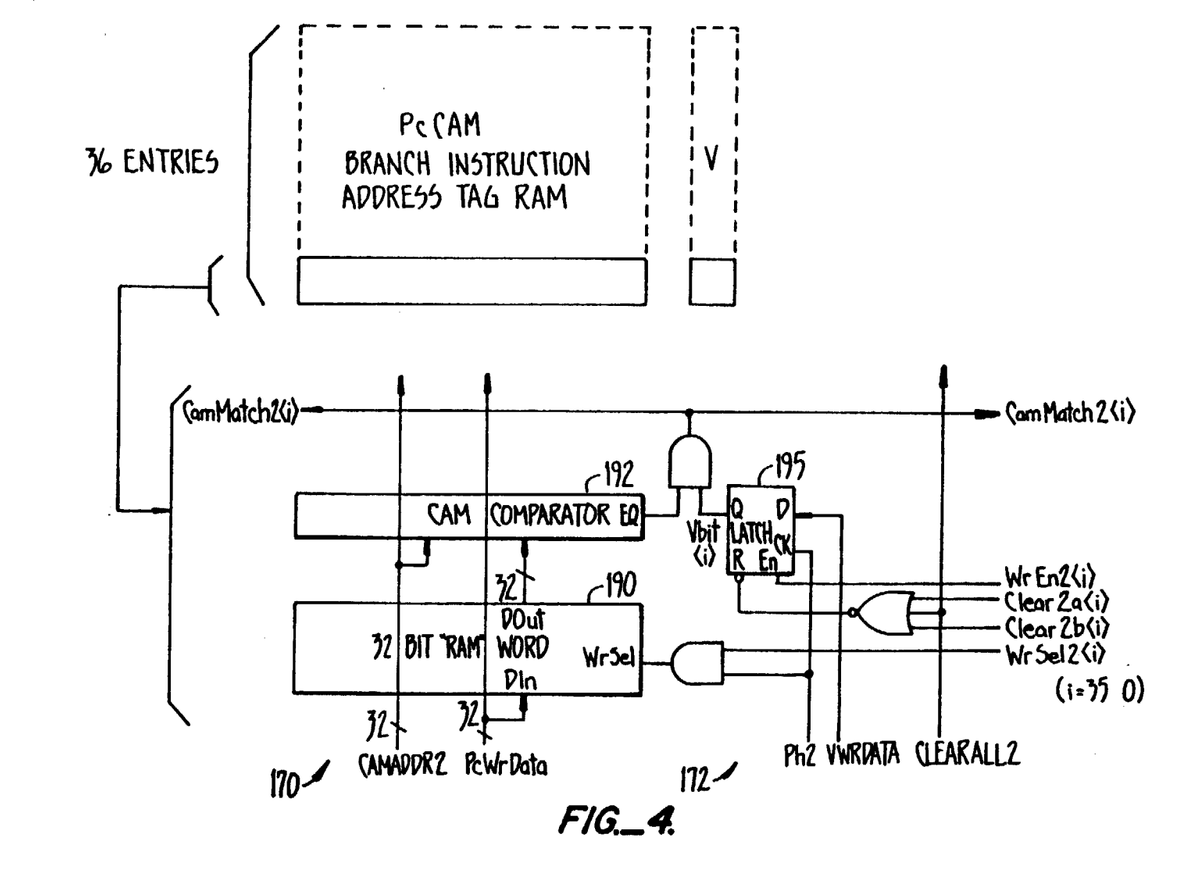
FIGS. 4, 5, 6, 7 and 8 are logic schematics of the various memory arrays and logic within the first level BPC.

FIG. 4 is a logic schematic of PcCAM 170 and associated Vbit memory 172. PcCAM 170 is a RAM/CAM array holding the instruction address of the branch for which each cache entry is storing prediction information. Each line in PcCAM 170 includes a 32-bit RAM word 190 and a CAM comparator 192. Each line in Vbit memory 172 holds a valid bit indicating the overall validity of the line, and is implemented as a latch 195. The CAM address input may be the address of the first byte of the next instruction to be decoded, and is compared with the contents of RAM word 190. In the event of equality, the CamMatch2 line for that entry is asserted, as qualified by a true output from Vbit latch 195.

The nature of PcCAM 170 supports fully associative BPC lookups and replacements. The CamMatch2 signal from each line is output for use by the other BPC components, while the RAM aspect of the array applies only to writing instruction addresses into the PcCAM.

Figure 5:
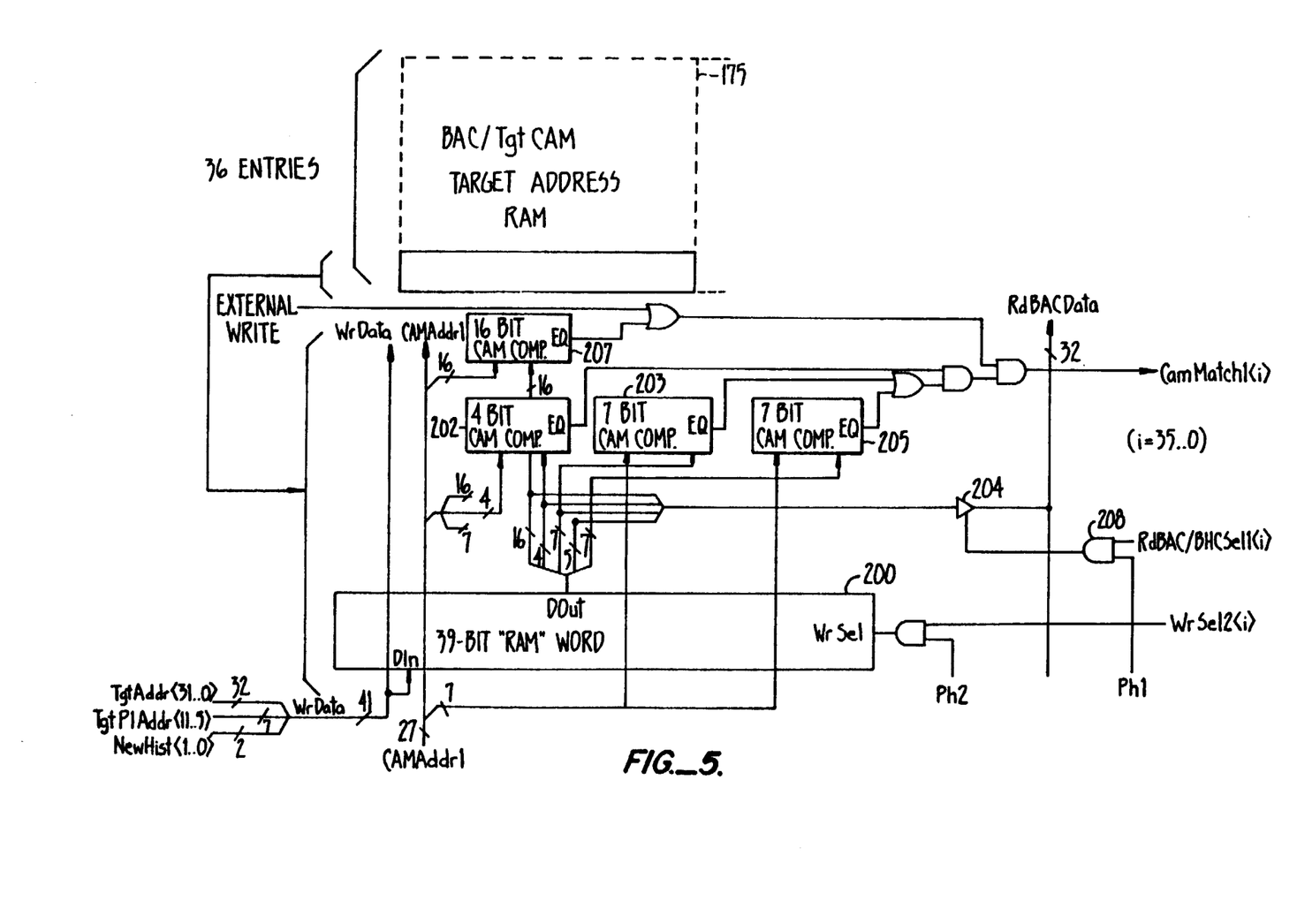

FIG. 5 is a logic schematic of BAC/TgtCAM 175. The BAC/TgtCAM is a mixed RAM/CAM array holding the target address from the most recent execution. Each line includes a 39-bit RAM word 200, a 4-bit CAM comparator 202, a pair of 7-bit CAM comparators 203 and 205, and a 16-bit CAM comparator 207. Of the 39 bits, 32 bits are the target address of the branch. The other 7 bits are additional target address information, as will be described below. The full 32-bit target address is made available for readout if the particular BAC/TgtCAM line is selected, as determined by CamMatch2 from PcCAM 170 via multiplexer 188.

The CAM segments of BAC/TgtCAM are used to detect memory stores by instructions currently being processed within the CPU pipeline. Since these instructions possibly modify target instruction bytes, it is necessary to invalidate the BPC entry in order to maintain proper coherency between target instruction bytes in the BTC and their image in main memory (actually in the ICache).

ICache RAM chip 30 contains 64 kilobytes, organized as 32-byte lines, and is thus characterized by an 11-bit address (the five low order bits may be ignored). The ITAG RAM contains the high order 16 bits. The 27-bit address ChkAddr of a line being written in the ICache is communicated to the CamAddr1 input of the BAC/TgtCAM. However, the BTC entry could straddle a line boundary, and so may be characterized by two line addresses. Thus, two target addresses (which may be the same) need to be stored and checked.

In fact, the high order 16 bits need not be checked for an external write, because the BPC is constrained to have only entries which are in the Icache for external writes. All variations of the upper 16 bits of instruction addresses which have the same 11 bits below must share the same Icache line so only 11 bits of each address need to be checked. Two 11-bit addresses in the BPC are checked, covering the possibly that two ICache lines could be spanned by a 24-byte BTC line. By requiring that the two lines be in the same 4-kilobyte page (i.e., that the BTC line not straddle a page boundary), the 4 most significant bits of the second 11-bit address will be the same as for the first 11 bit address, and can be ignored. To save space, the 7 bits of the second address are added to the same physical RAM word containing the 32-bit BAC address. CAM comparators 203 and 205 compare the two 7-bit fields of the RAM line with the corresponding 7 bits of ChkAddr on the CAMAddr1 input while CAM comparator 202 compares the 4-bit field in the RAM line with the corresponding 4 bits of ChkAddr.

A match is defined to have occurred on a particular line if the 4 bits of the 27-bit ChkAddr match the 4 bits of the RAM line (as detected by comparator 202), the 7 bits of the ChkAddr match either 7-bit field of the RAM line (as detected by comparators 203 and 205) and the external write line is enabled or (for internal writes) the 16-bit field of ChkAddr matches the 16-bit field of the RAM entry (as detected by comparator 207). If a match occurs (more than one can occur since more than one BTC entry can be affected by a write in a given line), the corresponding BPC entries are invalidated. The 32-bit branch target address can be read out through a driver 204 on data bus BACData.

Figure 6:
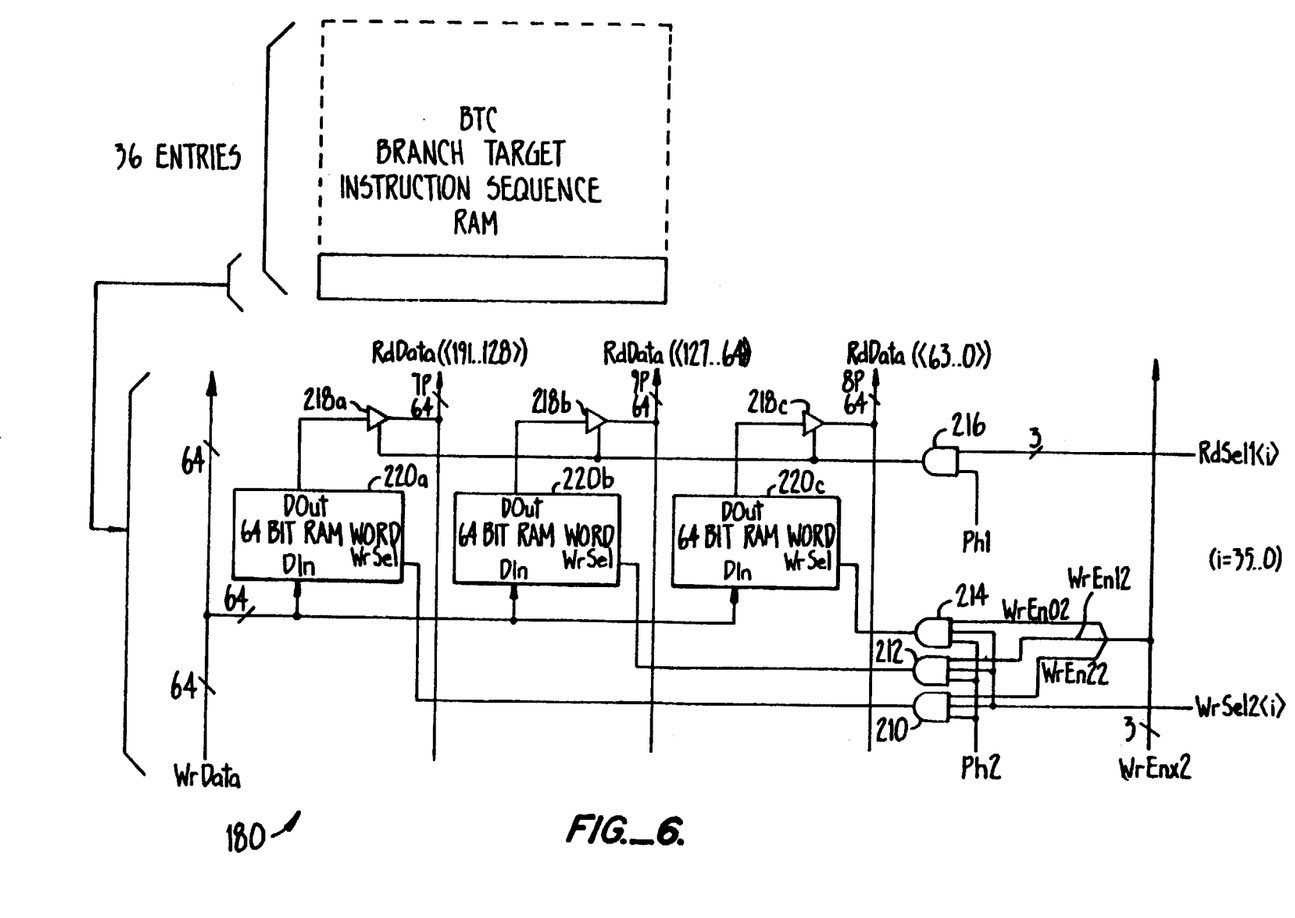

FIG. 6 is a logic schematic of BTC 180. Each BTC line comprises a 192-bit RAM word, implemented as three 64-bit RAM words (double-words) 220a, 220b, and 220c. The BTC holds the first few instructions as the target address of the branch (in this case, up to the first 24 bytes of target instructions). In the context of the preferred embodiment, in which a CISC architecture possessing variable byte length instructions is implemented, the BTC cache caches the target instruction stream image as found in main memory. As an alternative, the first one or several target instructions could be cached in an alternate, possibly decoded, representation that may be more suitable for other CPU implementations.

Each 64-bit output is provided through drivers 218a, 218b, and 218c, with each RAM word output forming a 64 bit portion of 192-bit Data output bus. The read select signal for a particular one of the 36 lines is provided through an AND gate 216. The write select signals are provided through a series of AND gates 210, 212, and 214.

Figure 7:
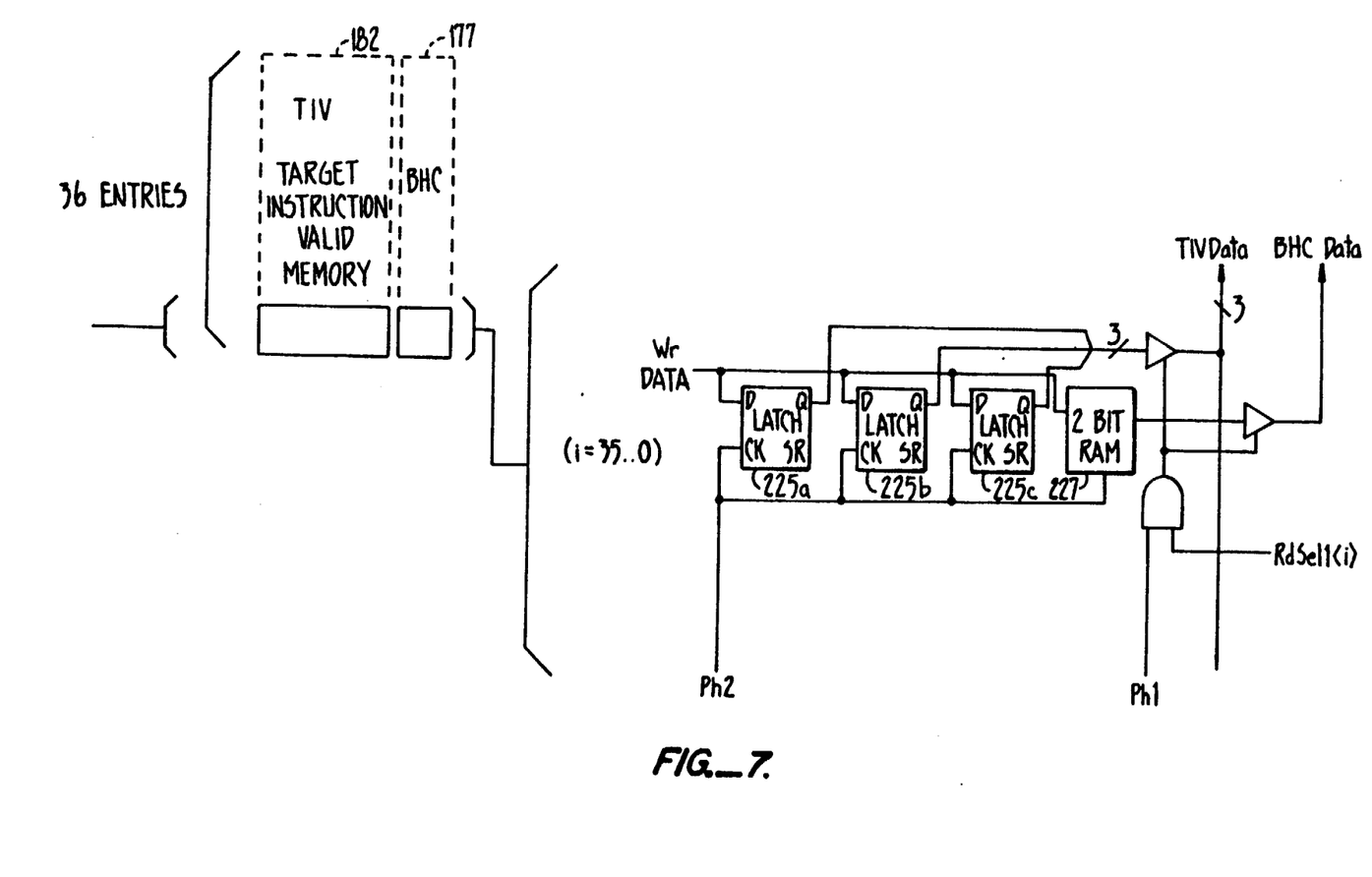

FIG. 7 is a logic schematic of TIV 182 and BHC 177. Each line of TIV 182 includes latches 225a, 225b, and 225c, each holding a valid bit corresponding to eight of the 24 instruction bytes within the BTC line. Each line of BHC 177 is a 2-bit RAM 227.

Figure 8:
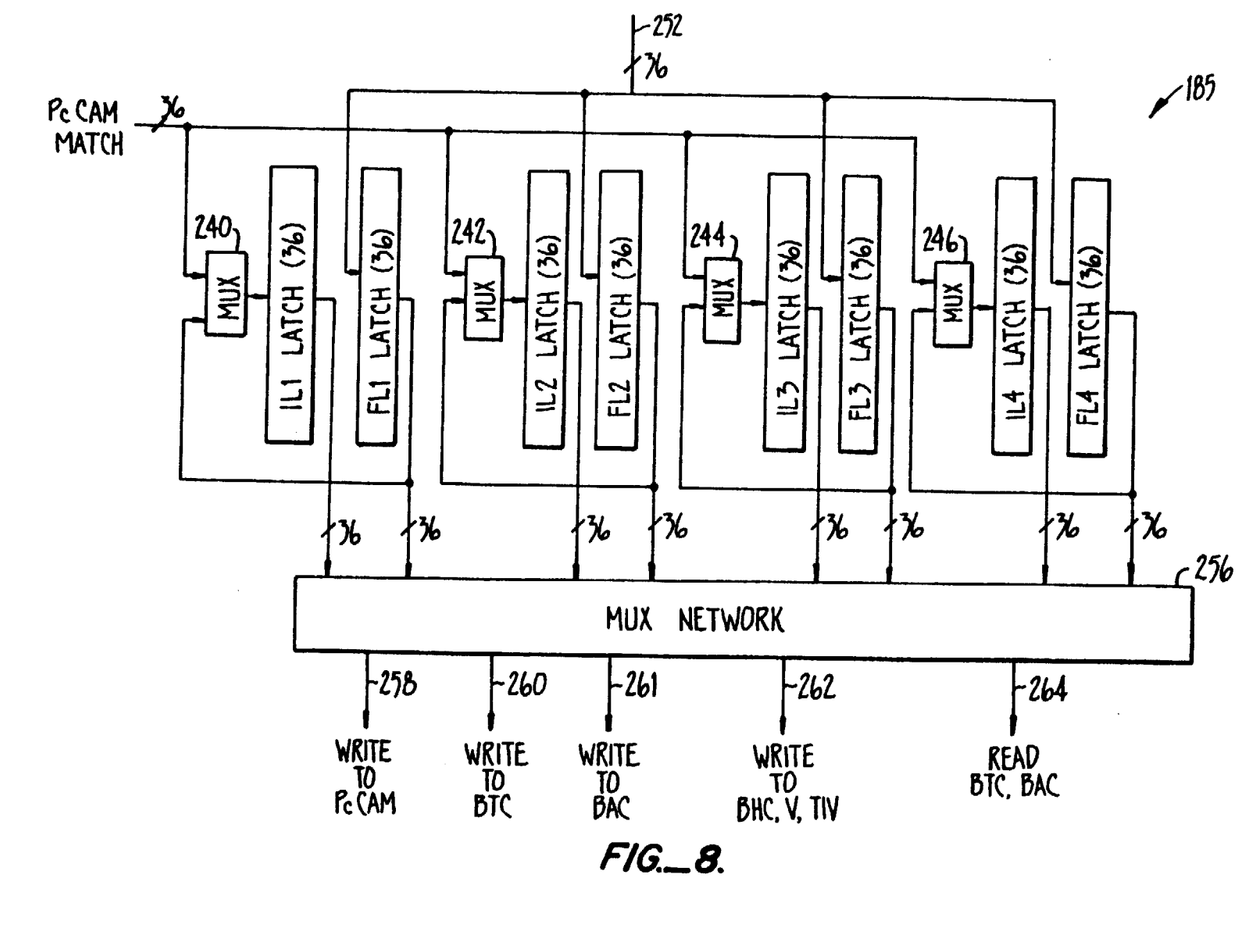

FIG. 8 is a logic schematic of address select circuitry 185. Four pairs of latches designated IL1, FL1 through IL4, FL4 are provided. The first latch (IL) in each pair stores a pointer to a line in the branch prediction cache. Four sets are provided to track multiple branches. The second latch (FL) in each pair is provided to point to a pre-fetch instruction queue which may be associated with each branch. One input to each of the IL latches is provided through multiplexers 240, 242, 244, and 246 from the PcCAM match line 248. Inputs to the FL latches are provided through a 36-bit input bus 252. The outputs of both the IL and the FL latches are provided to a multiplexing network 256.

The circuit of FIG. 8 provides a flexible approach to producing a number of control signal outputs from the multiplexing network 256, as discussed below. For example, a PcCAM match will provide a "1" bit on one of the 36 bit lines, with all the rest being zero. This could be written into latch IL1, for instance, so that a single bit in latch IL1 is enabled. The output could then be provided to multiplexing network 256 to activate the appropriate control lines for that entry.

Integrated BPC Data Paths

In the context of a highly pipelined architecture, it is desirable to be able to perform several operations on the BPC at one time. For example, typical operations would be accessing the BPC on every cycle. It might be desired to store target bytes in the BTC, to invalidate a line, or to update the history bits. As will be described in detail below, address select logic 185, PcCAM 170, and BAC/TgtCAM 175 provide various select and enable signals to control reading, writing, setting and clearing of addresses, instructions, and valid bits. The integrated BPC structure allows any number of these operations to be performed in the same cycle for different lines without contention of competing elements.

1. Read an Entire BPC Entry on a PcCAM Match. A first access path, used to access the BPC entry, is invoked by communicating a 32-bit DecodePC signal to the CamAddr2 input of PcCAM 170. If a match occurs, a single bit of the 36-bit CamMatch2 output 248 is asserted, and is communicated to read select inputs on the other memory elements, namely BAC 175, BHC 177, BTC 180, and TIV 182 via multiplexer 188. The result is that the corresponding entries, constituting the entire BPC entry, are read out of respective data outputs of the memory elements.

2. Write to PcCAM. A second access path, used to clear an old entry and start a new entry, is invoked by writing a 36-bit word, with all 0's except for a single bit, which has a 1, into one of the latches of FIG. 8 through input 248 and multiplexers 240, 242, 244, and 246. The desired 32-bit address to be stored is provided to the WrData input of PcCAM 170 (see FIG. 3). The output 258 of multiplexer network 256 is selected to assert signals at the WrSel2 input of PcCAM 170, and the Clear2a input of Vbit memory 172. This enables writing a new entry into the PcCAM, and clears the valid bit, pending acquisition of the target bytes. The same latch is used as a pointer for the BTC write, BAC write, and BHC, V and TIV writes for that entry.

One latch pair in address select logic 185 is a working latch pair which is not being used to track a particular branch at that time. The use of four sets of latches allows three instruction streams to be kept active (the orginal stream and two branches), while the fourth pair of latches is used for working purposes such as writing to PcCAM. The output of each FL latch, which is written to through address input 252, is also coupled back through the multiplexers 240-246 so that it can be written into the IL latch is desired.

In practice, the FL is loaded for access (2), a write to PcCAM. It remains unchanged throughout (3)-(6) style accesses below if there is a hit. If there is a miss and an entry is created, then the FL is reloaded to point to a new queue. Accesses (3)-(6) may then occur. Similarly, IL is loaded when there is a hit with the PcCAM output. It is then used for accesses (3)-(5).

3. Write to BTC. A third access path is used to fill in the BTC queue. The line is pointed to by the latch pointing to the PcCAM portion of the line. Eight byte select signals are provided to the WrEnx2 input of BTC 180. A single 8-byte block to be stored for the selected entry is provided to the WrData inputs on BTC 180. This allows part of a BTC entry to be written as multiplexer network 256 output 260 asserts select signals at inputs to the WrSel2 input of BTC 180.

4. Write to BAC. A fourth access path is used to write 39 bits of target address to the WrData inputs of BAC/TgtCAM 175 when the target address is available.

5. Write to BHC, V and TIV. For a fifth access path, a valid data bit is provided to the WrData input of Vbit memory 172, 3 bits are provided to TIV 182 and 2 bits of history information are provided to the WrData inputs of BHC 177. This allows completion of the BPC entry as output 262 of multiplexer network 256 is selected.

6. Read BTC and BAC. A sixth data path is invoked by referencing one of the IL or FL latches and as output 264 of multiplexing network 256. A select signal is also provided to multiplexer 188. This allows a given BTC and BAC line to be read out independently of any CAM hit from PcCAM 170. The entire BTC entry can be read, or one or more of the three double-words in the BTC entry can be read. This provides flexibility that allows certain otherwise unused BTC entries to be used for other purposes (such as instruction queues) and be controlled independently.

7. Consistency Check of BAC. A seventh access path is invoked by communicating ICache address information to the CAMAddr input of BAC/TgtCAM 175 for an external write to the Icache. As mentioned above, the CAM portion of BAC/TgtCAM 175 performs the function of maintaining consistency between the target instruction bytes in BTC 180 and corresponding bytes in main memory (actually in the instruction cache). A match causes assertion of the appropriate CamMatch1 output line 266, and clears the corresponding Vbit.

8. Invalidate All 36 BPC Entries. An eighth access path is invoked by asserting a signal at the ClearAll2 input 268 of Vbit 172. This can be carried out in a manner independent of other ongoing operations, and in some sense supercedes them all, because it invalidates all the BPC entries.

Second Level BPC

Figure 9:
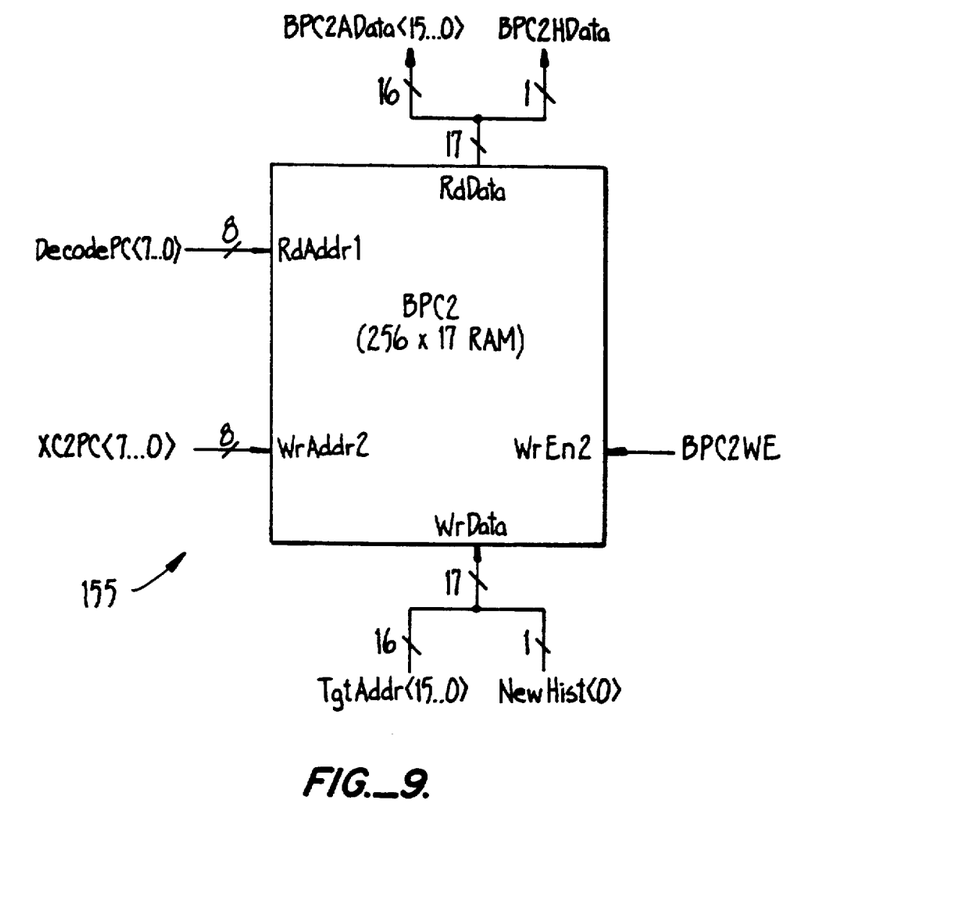
FIG. 9 is a logic schematic of the second level BPC.

FIG. 9 is a logic schematic of second level BPC 155. The second level BPC, unlike first level BPC 152, comprises entries containing only a limited amount of prediction information (17 bits as compared to 226 bits). This is offset by the much larger number of entries (256 as compared to 36 for the first level BPC), which are capable of implementation with a given amount of hardware circuitry. Second level BPC 155 is implemented as a 256×17 bit RAM. Each entry holds 2 bytes of a 4-byte target address (see discussion below why this is viable) and a single history bit.

The trade-off between the amount of information stored in each entry, and thus the cost in hardware circuitry, and the extent to which branch processing can be accelerated, is based in part on a recognition that by far the largest, and most costly, information component stored in a first level cache entry is the copy of the first several target instructions. For many 32-bit CISC architectures a typical average instruction length is in the range of 3-4 bytes, with significant variation up and down. To store branch target address and history information requires roughly four bytes. Comparing these numbers it is clear that to cache the first several target instructions in most cases, requires several times the number of instruction bytes as target address/history bytes.

A further recognition is that a significant part of the delays that can be incurred in processing a branch instruction is associated with the processing necessary before target instruction fetching can be initiated. This is particularly true in the context of the relatively long pipeline designs described earlier. The delay in actually fetching the first target instruction(s), particularly when from an instruction cache, is also significant but is not dominant.

Consequently, the size of a second level cache entry can be dramatically reduced by not caching target instructions, while the extent to which branch processing can be accelerated is reduced only moderately. This especially makes sense given that the second level cache serves as a backup to the first level cache.

Since the majority of branches are handled by the first level cache, the primary purpose of the second level cache is to cheaply minimize the processing delays stemming from as many of the rest of the branch instructions as is possible. A large part of the overall cost-effectiveness of this invention stems from the exchanging of a second level cache entry's ability to accelerate branch processing for hardware cost savings and substantial increases in the number of second level cache entries.

In the preferred embodiment of this invention, this idea is taken even further. As mention above, a second level BPC entry holds only a partial target address and one history bit. The predicted direction of a conditional branch is based simply on the direction last taken by that branch. The branch target address is assumed to be within a subset of the instruction address space also containing the branch instruction. For example, if the branch instruction and target instruction are assumed to be within the same 64-KB block, then only 16 bits of target address prediction information need be stored. The full predicted target address is a concatenation of the upper address bits from the branch instruction's address with the lower 16 bits from the cache entry.

Second level BPC 155 uses a direct-mapped access method, versus a set or fully associative method. This is acceptable due to the relatively large number of second level cache entries. Even more significantly, it is then possible to discard the tag and tag storage associated with each cache entry, along with the valid bit. In essence, when a cache look-up accesses a selected entry, it is simply assumed that the tag and look-up address match, and it is a hit.

This works, since a predicted address is obviously not guaranteed to be correct and since the alternative is to not make any target address prediction. Predicted target addresses must, of course, eventually be checked elsewhere within the CPU. In the implementation context of the preferred embodiment, a bad address prediction is no worse than no prediction. Further, the occurrence of such bad predictions corresponds to the miss rate of the second level cache and thus is reasonably low given the relatively large number of cache entries. This is also enhanced by applying the hardware savings from eliminating the tag storage to increasing the number of cache entries.

Operation

A first level cache size of 36 entries and second level cache size of 256 entries, in combination with a factor of 16 difference in per-entry cost, results in second-to-first level cache ratios of eight times the number of entries, yet still almost half the size. With this much larger size, even given the direct-mapped organization, the second level cache provides an effective backup to the first level cache.

As each branch instruction is fetched its address is used to perform parallel look-ups in the two levels of BPC: the large-set or fully associative first level access using the full branch address; and the direct-mapped, tag-less second level using only a subset of the address bits for the index.

If there is a tag match with a first level cache entry, then all of this entry's prediction information is read out, and the second level BPC is ignored. All the necessary predictions are made, effectively eliminating or hiding any delays in otherwise processing the branch instruction and in starting processing of successive instructions. Of course, when one or more of the predictions is subsequently found to be wrong, any hidden delays become exposed and possibly an additional delay incurred while the CPU pipeline is flushed and/or restored to an appropriate state from which to continue correct instruction processing.

In the case of a first level cache miss, the prediction information read out from the indexed second level cache entry is used to at least predict some aspects of the branch instruction's processing. As described earlier, a second level cache look-up effectively is assumed to always hit.

In the case of the preferred embodiment, a full 32-bit target address is predicted as well as, in the case of a conditional branch, the branch direction. This enables delays in the processing of the branch itself to be hidden; if the branch is predicted as being taken, this also includes initiation of target instruction fetching. Actually, because of the support for prefetching down multiple instruction streams, target instruction fetching will still tend to take place as a lower priority activity, even if the branch is predicted as not being taken. There will still be a delay before processing of target instructions can begin, if the branch is predicted taken.

Second level cache mis-predictions are the same as for the first level cache. There is also no substantive difference between whether the prediction was based on cached information from an earlier execution of this branch or from some other branch. With a low second level cache miss rate, the latter type of mis-prediction will be uncommon.

Conclusion

Thus it can be seen that the present invention provides a surprisingly effective and efficient approach to operation of a BPC, providing most of the benefits of a much larger structure.

While the above is a complete description of the preferred embodiments of the invention, various alternatives, modifications, and equivalents may be used. For example, while the first level cache is preferably implemented as fully associative, it could be implemented as a direct-mapped or set associative structure.

Therefore, the above description should not be taken as limiting the scope of the invention which is defined by the appended claims.

What is claimed is:

1. In a computer system having decode logic responsive to fetched instructions and an instruction cache from which instructions, including branch instructions, are fetched for execution, the improvement comprising:

means for generating an input PC representative of the address of an encountered instruction;

a first level branch prediction cache (BPC), separate from the instruction cache, having a first number N1 of lines for storing prediction information on up to N1 previously encountered branch instructions, each line capable of storing an entry providing prediction information at a first level of detail including the address of the branch instruction for which prediction information is stored, a target address for the branch instruction, target instruction bytes corresponding to the instruction stream starting at the target address, and branch history information representing the direction taken during at least one previous execution of the branch instruction;

means, associated with said first level BPC, for comparing said input PC with the address of the branch instruction in each of the first level BPC entries, and, in the event of a match between the input PC and the address of the branch instruction in the first level BPC entry, for enabling a first level BPC entry to be output and target instruction bytes in the first level BPC entry to be communicated to the decode logic;

a second level BPC, separate from the instruction cache, having a second number N2 of lines, larger than said first number of lines, for storing prediction information on up to N2 previously encountered branch instructions, each line capable of storing an entry providing prediction information at a second level of detail, lower than said first level of detail, including a portion of a target instruction address and branch history information representing the direction taken during at least one previous execution of the branch instruction for which prediction information is stored, said second level BPC being indexed by only a portion of the input PC; and means, associated with said second level BPC, for enabling a second level BPC entry to be output for use in the event that no match exists in said first level BPC.

2. The improvement of claim 1 wherein said second level BPC contains no tag bits relating to said input PC.

3. In the operation of a computer system wherein instructions, including branch instructions, are fetched for execution and communicated to decode logic, a method of predicting branch outcome, comprising the steps of:

generating an input PC representative of the address of an encountered instruction;

providing a first level BPC having a first number of lines;

storing in each of at least some of the lines of the first level BPC respective entries providing information corresponding to respective previously encountered branch instructions, each entry including the address of the respective branch instruction, a target address for the respective branch instruction, target instruction bytes corresponding to the instruction stream starting at the target address, and branch history information representing the direction taken during at least one previous execution of the respective branch instruction;

comparing the input PC with the address of the branch instruction in each of the first level BPC entries, and, in the event of a match between the PC and the address of the branch instruction for a particular first level BPC entry, enabling the particular first level BPC entry to be output and target bytes in the first level BPC entry to be communicated to the decode logic; and providing a second level BPC having a second number, larger than said first number, of lines;

storing in each of at least some of the lines of the second level BPC respective entries providing information corresponding to respective previously encountered branch instructions, each entry including a portion of a target instruction address and branch history information representing the direction taken during at least one previous execution of the branch instruction, the second level BPC being indexed by only a portion of the input PC; and enabling a second level BPC entry to be output for use in the event that no match exists in the first level BPC.

* * * * *